Patented Feb. 19, 1929.

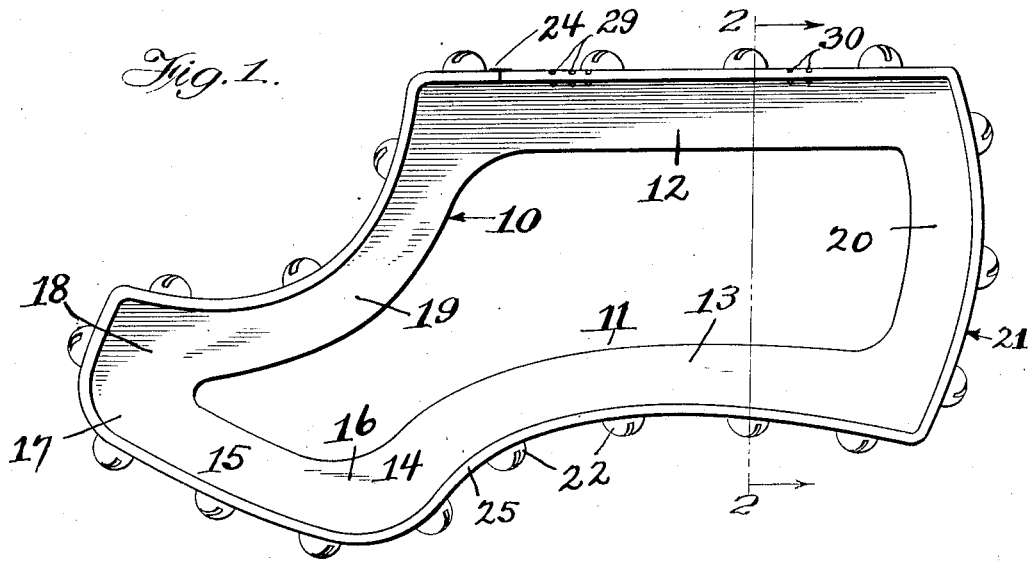
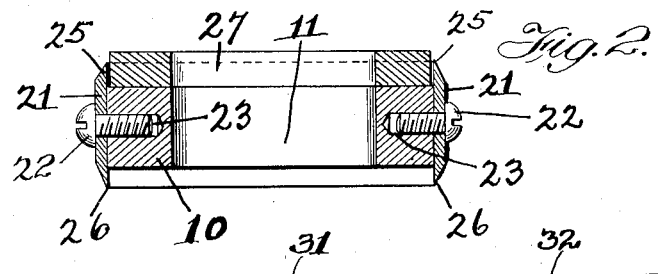
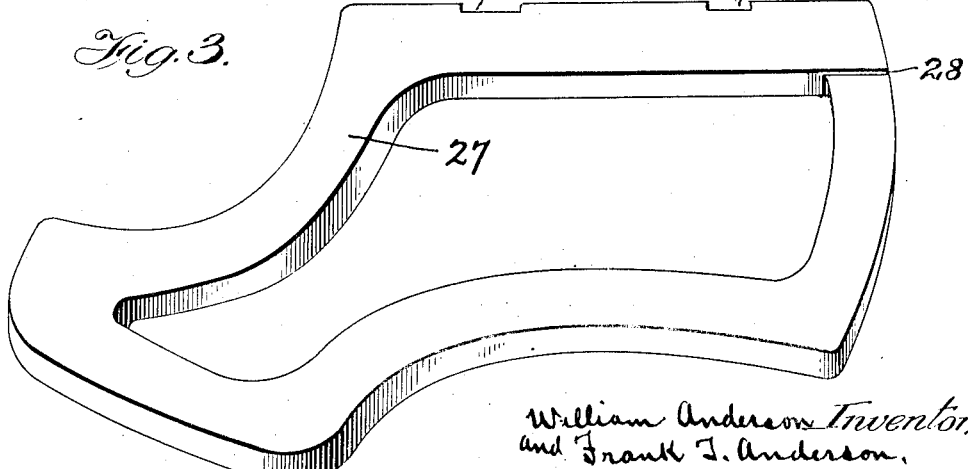

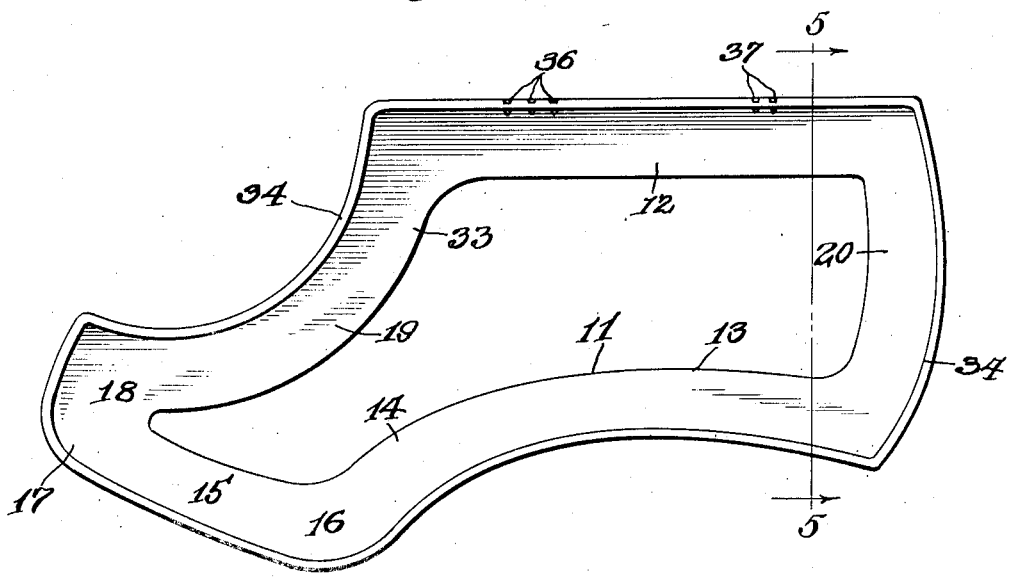
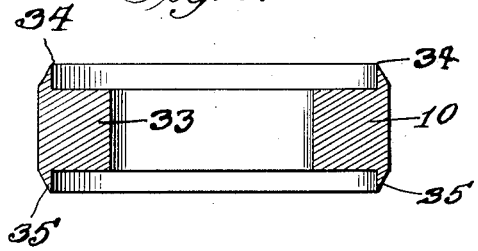

1,702,956

UNITED STATES PATENT OFFICE.

WILLIAM ANDERSON AND FRANK T. ANDERSON, OF CHICAGO, ILLINOIS, ASSIGNORS TO CHICAGO CUTTING DIE CO., OF CHICAGO, ILLINOIS, A CORPORATION OF ILLINOIS.

REVERSIBLE DIE FOR CUTTING UPPERS FOR OXFORDS AND LOW SHOES.

Application filed May 21, 1927. Serial No. 193,156.

This invention relates to a die for cutting uppers for oxfords and low shoes, and more particularly to a reversible or double edge cutting die adapted to be used for cutting uppers for both sides of a shoe.

The present invention has for an object to provide dies for cutting uppers, bound by cutting blades or edges formed separate as a band of steel or integral with the frame or body of the die and ground at the outside of its opposite edges to form cutting edges and provided with an open frame shaped to conform to the outline and size of the part or upper to be cut, and with a rigid permanent ledge on the inside to receive a pressure frame, as distinguished from the outside which is objectionable owing to the difficulty of manufacture and in sharpening the cutting edges, objections which are overcome by the present construction, owing to the facility with which the cutting edges can be sharpened.

The invention also has for an object to provide a die by which the cutter can pick out defective portions of the leather and place his die so that the defective parts are avoided in the uppers, the die comprising a frame having an open center and having a detachable band of steel or with integral cutting edges or blades forming the cutting edges, the band when separate being produced of a single piece of metal, preferably steel connected in a novel manner to the frame by fastening means permitting convenient removal for sharpening or replacement as well as positively retaining its shape and being capable of economical production as well as being efficient in use and when formed integral with the frame, being made therewith as a drop forging or otherwise and having projecting edges sharpened to produce the double or opposite cutting edges or blades, with markings or notches in the cutting edges to indicate the size of the die and the size and width of the uppers cut or stamped out thereby.

A further object is to provide a novel pressure frame for exerting the necessary blow or pressure on the die by suitable means, such as a stamping press, such as the ram or buffer of a cutting, stamping or punching press, and to provide for the retention of the pressure frame in position.

With the above and other objects in view, the invention consists in certain novel combinations and arrangements of parts to be hereinafter described.

In the accompanying drawings:

Figure 1 is a plan view of a cutting die constituting one form of the invention in which the cutting blade is separate from the die frame or body and attached, and with the pressure frame removed, Figure 2 is a sectional view taken on the line 2—2 of Figure 1 with the pressure frame applied, Figure 3 is a perspective view of the pressure frame, Figure 4 is a plan view of a form of cutting die in which the cutting blade is formed integral with the frame or body of the die, as in a drop forging, and Figure 5 is a sectional view taken on the line 5—5 of Figure 4.

Referring to the drawings in detail, the die consists of an aluminum, white metal aluminum composition, steel or other desired metallic frame or body 10 of the desired shape of the upper to be cut having a central opening 11 through which the portions of the leather are rendered visible so that the cutter can pick out the defective parts of the leather owing to the fact that the same will not be covered by the body of the die and thereby place the die so that the defective parts are avoided and the production of a defective upper avoided. The frame as shown has a straight side 12 and an inwardly curved opposite side 13 directed outwardly as at 14 and then extended inwardly in a substantially straight line as indicated at 15, the corners 16 and 17 being curved and having the tapered end 18 which is directed upwardly in curved formation extending inwardly as at 19 to join the end of the straight side 12. The opposite end is convexed outwardly as indicated at 20 and as will be seen in Figure 2 of the drawings, the frame is of rectangular cross-section. Of course, it is to be understood that the shape of the frame will depend upon the shape of the upper to be cut and the design to be formed in connection with the shoe.

The metal frame of the die is bound by a band of sheet steel designated at 21 secured in position by a plurality of spaced screws or other fastenings 22, preferably detachable and engaging threaded sockets 23 extending transversely into the frame from the outer face thereof, the fastenings being substantially uniformly spaced apart and the openings extending partially into the frame or entirely through the same as desired. The ends of the band or strip of sheet steel are brazed together or otherwise molecularly joined as at the point 24, thus practically forming an integral structure without visible joints and permitting the use of a single length of material forming the strip or band of the cutter omitting all joints and braces at the corners or otherwise. The band is ground at its opposite edges on the outside to provide cutting edges 25 and 26 which project from the opposite top and bottom faces of the frame 10 as clearly shown in Figures 1 and 2, thus providing a reversible or double blade with opposite cutting edges, that is, one on either side to avoid the necessity of making two dies, namely right and left hand dies. The cutting edge on one side of the die is used for cutting right hand uppers and the other side for left hand uppers. This construction is such that the cutting edges of the blade project above and below the body or frame of the die indicated at 10, thus providing ledges at the opposite or top and bottom faces of the frame or body 10 to which the pressure is applied by means of a removable pressure frame designated at 27.

In order to protect the cutting edges of the die in applying to the die or frame in producing the uppers with the cutting edges 25 and 26, the die is provided with a separate or removable aluminum or other metal frame 27 conforming in shape to the frame 10 but of considerably less thickness and also conforming to the outlines of the steel band or cutting edge at the inside, but of sufficient thickness to project above or outwardly of the cutting edge, that is with a thickness greater than the projection of the cutting edge from the face of the die at each side, as more particularly shown in Figure 2 of the drawings, so that when the die is placed under the stamping press, the cutting edges will be protected and not destroyed by the press head. That is, the press will act upon the pressure frame 27 which is shaped the same as the frame 10 and a positive pressure will be exerted upon the frame 10 to cut the leather. By reversing the die frame 10, the cutting edges 25 and 26 will cut the right and left hand uppers.

It will be seen by providing the metal frame, the attachment of the band forming the cutting edges or cutter blade, is much simplified, only transverse fastening means as shown at 22 extending from the outer side being necessary to secure the cutting band in position, which fastening means can be readily removed for sharpening or replacement of the band or cutter blade although sharpening may be done without removing the blade. Furthermore, the opening 11 permits the cutter or operator to see the defective spots in the leather which is to be cut by the die to form the uppers, thereby avoiding defective portions in the leather or the upper which would result in defective shoes or considerable loss in leather owing to the fact that stampings having defective parts cannot be used.

If desired, the pressure frame 27 may be provided with a split or cut 28 at one end such as between the portions 12 and 20 giving the same a resilient or spring effect outward to spread within the cutting blade on the ledge to which applied, it being understood that the ledges are at opposite sides of the body or frame 10 applied to the opposite cutting edges 25 and 26. This will serve to grip within the cutting edges of the blade and retain the pressure frame in position and against displacement due to the impact and pressure in the die or stamping operation of cutting the uppers. It is, of course, to be understood that the device is adapted for cutting leather, canvas or other material used in the making of shoes. Also, the edges of the cutting blades at 25 and 26 may be notched, indented or serrated as with V shaped notches designated at 29 and 30, to indicate the size of the die and also the size and width of the upper to be cut thereby. The frame 27 will have corresponding recesses 31 and 32 to accommodate the pressed in edges or notches 29 and 30 when the frame is positioned upon the ledge within the cutting blades.

In the form of the invention shown in Figures 4 and 5 of the drawings, the frame 33 corresponds in form to the frame 10 and has the opposite or double cutting edges 34 and 35 formed integral therewith as by means of a drop forging or other similar operation but preferably the former. This drop forging of steel or other suitable material results in a continuous integral blade forming with opposite double cutting edges 34 and 35 which are beveled off or sharpened in a similar manner to the blade 21 indicated in Figures 1 and 2 of the drawings. This results in the opposite faces of the frame 33 forming ledges inwardly of the cutting blade or edges 34 and 35 to similarly receive the pressure frame 27 as heretofore described so that the pressure frame will project from the cutting edges when placed on the upwardly facing or top ledge as shown in Figure 2 of the drawing. Of course, the pressure frame will be applied to the opposite ledge when the die is reversed and will then project from the cutting edge opposite. In one instance it will project from the cutting edges 25 and 34 and in the reverse position will project from the cutting edges 26 and 35 in the respective forms of the invention described. In either case, the split 28 will result in the pressure frame being held in position, although I do not desire to be restricted to this particular split in the pressure frame as it may be made of a continuous construction. The cutting edges 34 and 35 are also provided with the notches designated at 36 and 37 in order to indicate the size of the die and the size of the length of leather or other material forming the upper according to the size of the shoe. These, of course, will be accommodated in the notches or recesses 31 and 32 of the pressure frame 27 as heretofore described and in both forms, the formation of the cutting edges and the sharpening thereof may be accomplished with dispatch.

While we have shown our invention in the preferred forms, it is to be understood that other modifications, changes in the arrangement and proportion of parts may be made without departing from the spirit and scope of the invention.

While we have described the invention as particularly adapted for cutting uppers for oxfords and low shoes, it is to be understood that the reversible die is adapted for cutting any desired blank according to the shape thereof and that the outline will depend upon the particular blank to be cut. It may also be used for cutting leather for gloves, or any other suitable material for similar article or articles in which blanks are cut, and that it may be used for cutting material other than leather, such as canvas, cloth or the like.

Having thus described our invention what we claim is:

1. A die for cutting uppers for oxfords and low shoes and the like comprising an open frame and a blade on the outer edge of the frame with a cutting edge projecting from either face thereof to form a depressed ledge, and a pressure frame adapted to fit on said ledge, said pressure frame being of a thickness to project beyond the cutting edge and having a split causing said frame to slightly expand within the blade to retain the same in position.

2. A cutting die comprising a looped blade having its opposite edges inwardly beveled to form cutting edges, a ledge extending inwardly from the center of said blade equidistantly from said cutting edges, and an expansible pressure frame seated on said ledge within said blade with friction fit and of a thickness greater than the distance of said ledge from either of said cutting edges.

3. A cutting die comprising a looped blade having its opposite edges inwardly beveled to form cutting edges, a ledge extending inwardly from the center of said blade equidistantly from said edges and forming a central aperture having its edge substantially parallel to said blade; and an expansible pressure frame of substantially the same width as said ledge and of a thickness greater than the distance of said ledge from either of said cutting edges and adapted to seat on either face of said ledge with friction fit within said blade.

In testimony whereof we affix our signatures.

WILLIAM ANDERSON.
FRANK T. ANDERSON.